United States Patent
Assouline et al.

[11] 3,829,684
[45] Aug. 13, 1974

[54] LIQUID CRYSTAL IMAGE CONVERTER SYSTEM RESPONSIVE TO IONIZING RADIATION

[75] Inventors: Georges Assouline; Michel Hareng; Eugene Leiba, all of Paris, France

[73] Assignee: Thomson - CSF, Paris, France

[22] Filed: Apr. 19, 1973

[21] Appl. No.: 352,706

[30] Foreign Application Priority Data
Apr. 25, 1972   France .............................. 72.14641

[52] U.S. Cl. ............. 250/213 R, 250/331, 250/484, 350/160 LC
[51] Int. Cl. .......................................... H01j 31/50
[58] Field of Search ......... 250/331, 213 R, 213 VT, 250/484; 350/160 LC; 313/108 A

[56] References Cited
UNITED STATES PATENTS

| | | | |
|---|---|---|---|
| 3,644,741 | 2/1972 | Ovshinsky | 250/213 R |
| 3,666,881 | 5/1972 | Stein | 350/160 |
| 3,707,322 | 12/1972 | Wysocki | 250/213 R |
| 3,732,429 | 5/1973 | Braunstein | 350/160 LC |

*Primary Examiner*—James W. Lawrence
*Assistant Examiner*—D. C. Nelms
*Attorney, Agent, or Firm*—Cushman, Darby & Cushman

[57] ABSTRACT

The invention relates to the display of visible images corresponding to patterns projected by means of ionizing agents such as X-rays, γ-rays or particle beams. The image converter in accordance with the invention comprises: a fluorescent screen optically coupled to a photoconductive film, the latter being electrically coupled to a liquid crystal film whose dynamic scattering properties are utilised to render visible the patterns projected onto the fluorescent screen by means of the ionizing radiation.

11 Claims, 5 Drawing Figures

LIQUID CRYSTAL IMAGE CONVERTER SYSTEM RESPONSIVE TO IONIZING RADIATION

The present invention relates to the visible display of images projected either by particle beams or by electromagnetic radiation of a wavelength smaller than that of the visible light. It relates more particularly to the visible display of patterns produced by X-rays, such patterns, being encountered generally in radioscopy and in radiography where they are converted into visible images through the medium of fluorescent films or photosensitive emulsions deposited upon appropriate substrates.

During a radioscopic or X-ray inspection, a certain fraction of X-ray dose is received by the operator and, over a period of time, this constitutes a source of danger. This danger can be avoided by the technique of radiography which makes it possible for the operator to stay out of the danger zone whilst the patient is irradiated, but this solution has the drawback that for each shot, it is necessary to waste time in processing the radiographic film. It would be possible to carry out a radioscopic examination at a reduced ionizing radiation dose, but observation of the image would have to be made in a room where the ambient lighting level was very dim and in any case an image seen under these conditions would lack contrast.

To overcome these drawbacks, the invention proposes a display system, based upon the control, by electrical polarisation, of the diffusing properties of a liquid crystal film associated with a photoconductor film receiving the light generated by the excitation of an appropriate fluorescent film. The stratified structure composed of a liquid crystal, a photoconductor and a fluorescent substance, makes it possible to carry out radioscopic examination at very low dose levels, in a normally lighted room and with excellent contrast; if the liquid crystal is of the type having storage properties it is possible to separate the irradiation and observation phases so that the operator is protected against the dangerous effects of radiation without, however, losing the advantages accrued from direct radioscopic inspection.

In accordance with the present invention, there is provided a liquid crystal image converter system for displaying a visible image in response to an image bearing beam of ionizing radiation, said system comprising: a screen of fluorescent material for collecting said beam, a photoconductor film having one face optically coupled with said screen, a liquid crystal film electrically coupled to the face of said photoconductor film opposite said one face, and electrical biasing means for applying a voltage across said films; the electrical coupling of said films allowing the transmission of a non-uniform potential distribution; said photoconductor film being photo-induced by said radiation through the medium of said screen; the voltage drop across said liquid crystal film rising above the dynamic scattering threshold of said liquid crystal within each photo-induced area of said photoconductor film.

For a better understanding of the invention, and to show how the same may be carried into effect, reference will be made to the ensuing description and the attached figures among which:

Figure 1:
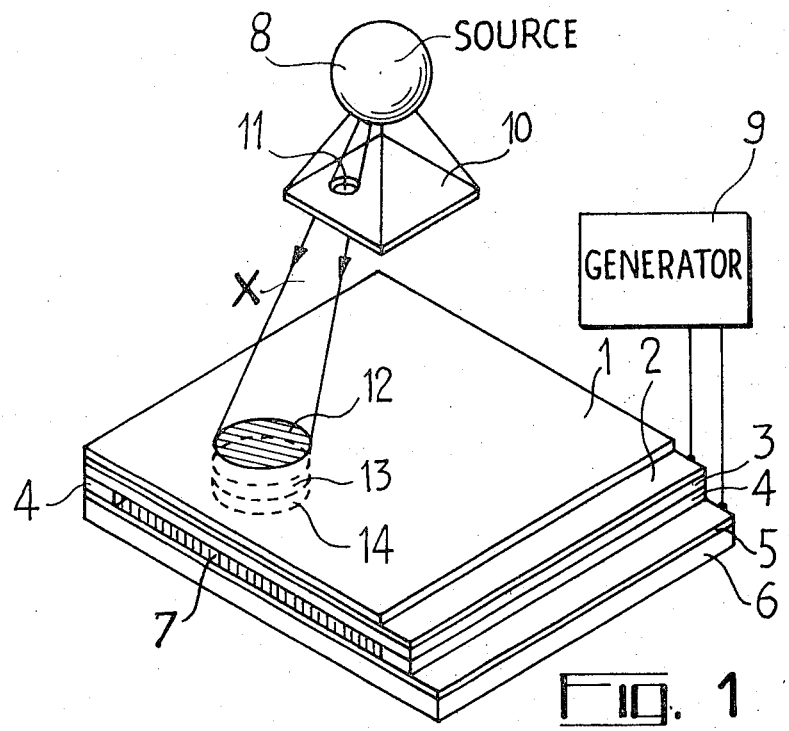
FIG. 1 illustrates a perspective view of the image converter system in accordance with the invention and of means for forming the non-visible pattern which is to be converted into a visible image.

FIG. 1 shows an image converter system for displaying a visible image in response to an image bearing beam of ionizing radiation such as X-ray radiation, which is supplied from a radiation source 8; this image corresponds for example to the non-visible shadow produced by an object 10 intercepting the beam emitted by the source 8.

The transparent zone 11 of the object 10 projects onto the screen 1 a spot 12 which, if the radiation were of the visible kind, would be a light spot on a dark background. The screen 1 constitutes the input face of the image converter system in accordance with the invention. This screen 1 is constituted by a fluorescent material deposited upon a transparent conductive electrode 2, which covers the top face of a film 3 of photoconductor material. The film 3 rests at its ends on insulators 4 and these in turn rest upon a mating transparent electrode 5 which cover a transparent plate 6. In the space between the plate 3 and the mating electrode 5, there is a liquid crystal film 7 which can either be a nematic phase crystal or a mixture of nematic phase and cholesteric phase crystals. Electrical biasing means including an electrical generator 9 and electrodes 2 and 5 are provided for applying a voltage across the pair constituted by the photoconductor film and the liquid crystal film. This voltage splits into two voltage drops respectively between the faces of the photoconductor 3 and those of the liquid crystal 7. If the photoconductor 3 is not irradiated, it carries virtually the whole of the applied voltage; the liquid crystal carries only a small fraction of the applied voltage and this fraction is lower than the threshold voltage beyond which the liquid crystal ceases to be transparent and becomes diffusive (dynamic scattering). The total voltage applied between the electrodes 2 and 5 should exceed the dynamic scattering threshold of the liquid crystal film 7.

Considering the spot 12 projected upon the fluorescent screen 1, it will be seen that the underlying region 13 of the photoconductor is illuminated by the radiation emitted by the screen; this radiation is capable of creating charge carriers and renders the zone 13 of the photoconductor conductive. The voltage drop therefore reduces between the faces of the zone 13 whilst it rises between the faces of the zone 14 of the liquid crystal. The result is that dynamic scattering occurs within the zone 13 whilst its surroundings remain transparent. If the back face 6 of the system shown in FIG. 1 is illuminated, the read-out light is scattered only in the zone 14 of the liquid crystal.

Figure 2:
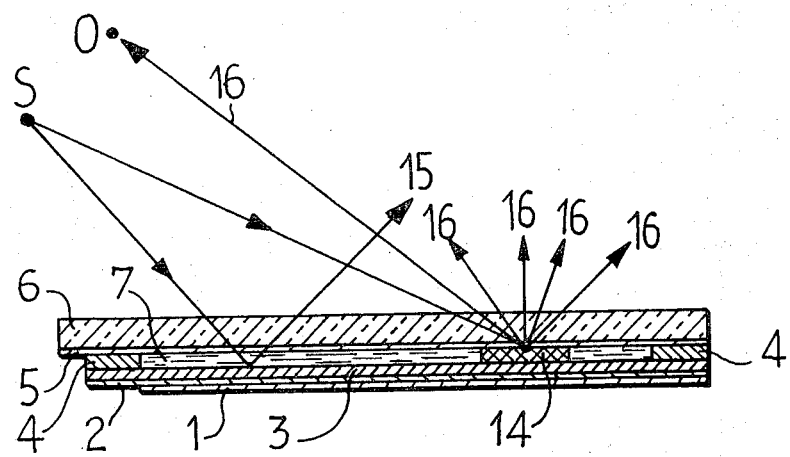
FIG. 2 is a sectional view through the device shown in FIG. 1 illustrating the viewing method.

In FIG. 2, a sectional view of the device shown in FIG. 1 has been illustrated, with a read-out light source S which illuminates the assembly of the liquid crystal film 7. In the transparent regions of the crystals, the incident light is absorbed, transmitted or reflected in accordance with the ray 15 which does not reach an observer O located in the vicinity of the source S; this observer therefore sees a dark background in these transparent areas. By contrast, the scattering zone 14 of the liquid crystal scatters the rays 16, a fraction of which are received by the observer; this zone therefore appears luminous to him and provides a visible representation of the pattern projected onto the screen 1.

If the pattern projected upon the screen 1 has shades of intensity, this is translated into terms of a sharp contrast in the visible image produced by the liquid crystal; this is a major advantage where the straightforward perception of image details is concerned. This advantage is due to the presence of a threshold in the dynamic scattering characteristics of liquid crystals. In addition, since the observed image is directly linked with the incident light intensity on the liquid crystal, the existence of strong ambient lighting does not affect its observations.

The image converter system illustrated in FIGS. 1 and 2 makes it possible to carry out direct radioscopic inspection in the manner practised with an ordinary fluorescent screen. By utilising a nematic liquid crystal, it is possible to follow the changes in the appearance of the projected image because the dynamic scattering phenomenon is reversible. In this case, the bias voltage is applied throughout the time of inspection or at least during the time of irradiation of the object.

By making the liquid crystal film of a mixture of a nematic crystal and a cholesteric crystal, it is possible to retain the fixed image corresponding to the scattering state, for an appreciable time. With this kind of persistance, once the irradiation of the object has been discontinued and the bias voltage removed, a stable image can be seen without it being necessary to employ a chemical process of development or fixing. This capability to store the image, enables the observer to carry out a radioscopic inspection without the least risk since he is not exposed to the radiation himself and examines the image after the irradiation has in fact ceased. The display system with this kind of persistance or storage effect, can be erased by the application to its electrodes of an alternating erase voltage.

It is worth mentioning that in order to achieve good sensitivity in the image converter system, a fluorescent screen 1 should be associated with the photoconductor film 3. In the absence of the fluorescent screen, the ionizing radiation would also give rise to an increased conduction on the part of the photoconductor film 3 but this increase turns out to be much less than that which is obtained through the medium of fluorescent screen 1.

To obtain optimum sensitivity, a photoconductor material should be chosen which has a high sensitivity in the range of the wavelength of the radiation emitted by the screen 1. If the photoconductor utilised is sensitive to ambient light, then the display system must be housed in an opaque envelope which is permeable nevertheless to X-rays; if the liquid crystal film is of the persistance or storage type, this envelope is removed for read-out.

Figure 3:
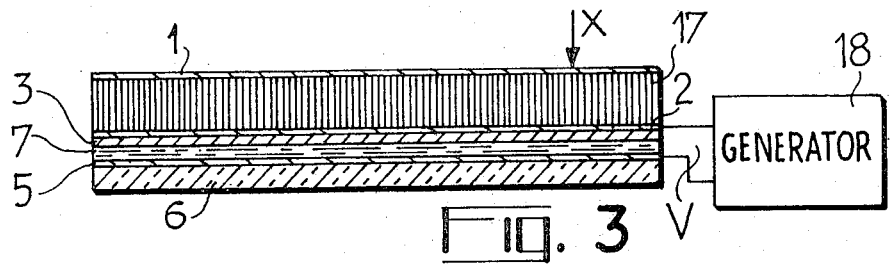
FIG. 3 is a sectional view of a first variant embodiment of the device shown in FIG. 1.

The structure illustrated in FIGS. 1 and 2 is relatively fragile because the liquid crystal film 7 is trapped between the plate 6 and the thin photoconductor film 3. To make the system more robust whilst at the same time considerably reducing the thickness of the photoconductor film 3, the latter can be deposited upon a plate of transverse optical fibres. In FIG. 3, a sectional view through a first embodiment of the image converter system can be seen, in which, in the same order of superimposition as used in FIGS. 1 and 2, there can be seen the substrate 6, the electrode 5, the liquid crystal film 7, the photoconductor film 3 and the electrode 2. The bias voltage source 18 is again connected to the electrodes 2 and 5 but the screen 1, which receives the projected X-ray pattern, is separated from the electrode 2 by a supporting plate 17 the optical fibres of which, embbedded in a binder, optically interconnect the two faces point by point. The excitatory radiation emitted by the screen 1 is thus transmitted to the photoconductive film 3 by the plate 17 as if the screen 1 had been directly deposited upon the electrode 2.

By way of non-limitative example, the image converter system shown in FIG. 3 can be produced in the following fashion for application to X-ray radioscopy. The fluorescent screen 1 is a silver-activated zinc-cadmium sulfide film deposited upon the top face of the optical fibre plate 17; on the bottom face of said plate 17, there are successively deposited an indium oxide film constituting the electrode 2 and the photoconductor film 3 of cadmium sulfide. The free face of the cadmium sulfide film 3 is arranged opposite the free face of an indium oxide film 5 deposited upon a glass plate 6; the spacing between the free faces is made equal to 20 microns and into the space there is introduced a mixture of liquid crystals comprising for example 85 percent methoxybenzylidene-butyl-aniline (nematic) and 15 percent cholesterylerucate (cholesteric). This liquid crystal film is of the persistence or storage type; it can be erased by applying to the electrodes of a display system an alternating voltage with a rms value of 80 volts or thereabouts. The thicknesses of the plages 6 and 17 are chosen as a function of their area to give the system adequate robustness.

In the variant embodiment shown in FIG. 3, the X-ray pattern to be displayed is projected directly onto the fluorescent screen 1 in order to produce light emission transmitted in loss-free fashion by the optical fibre plate 17.

Figure 4:
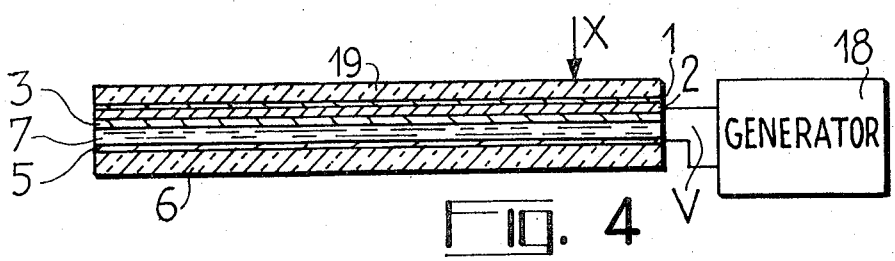
FIG. 4 is a sectional view of another variant embodiment of the device shown in FIG. 1.

In FIG. 4, a sectional view can be seen of another embodiment of the image converter system, in which the fluorescent screen 1 has been moved a great deal closer to the photoconductor film 3, the optical fibre plate having been discarded. To this end, the carrier for the films 1, 2 and 3 is constituted by a glass window 19 which receives the projected X-ray image and transmits it to the screen 1 without substantial attenuation. In FIG. 4, it can be seen that the bottom face of the plate 19 carries the fluorescent screen 1 from which the electrode 1 and the photoconductor film 3 are deposited. In the case of X-ray radiation, the attenuation of the projected image can be reduced by cutting the plate 19 in beryllium, because this material is more transparent than glass, to X-rays.

Figure 5:
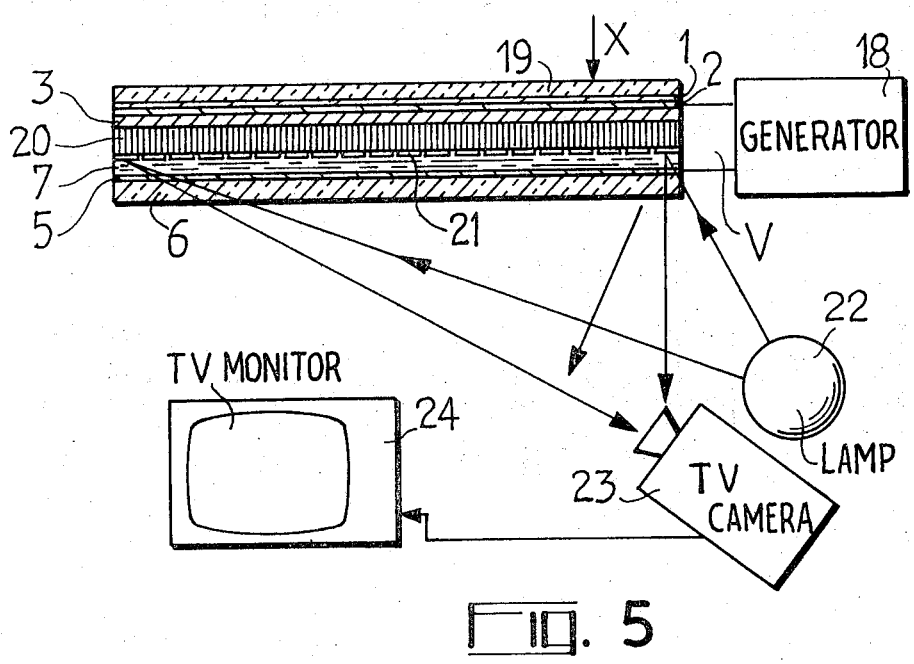
FIG. 5 is a sectional view of a further variant embodiment of the device shown in FIG. 1, which makes it possible to carry out continuous radioscopic inspection.

In FIG. 5, a sectional view can be seen of a further variant embodiment of the image converter system in accordance with the invention. This system is particularly well-suited to the case of continuous radioscopic inspection, the liquid crystal film is designed to respond instantaneously to the modifications experienced by the projected image, and the light utilised for seeing the image should not contribute to rendering the photoconductor film conductive.

To achieve this result, the liquid crystal film 7 is made of a nematic crystal having no storage capability. It is delimited beneath by an electrode 5 deposited upon a transparent plate 6 and above by an assembly of superimposed elements which comprise, working from top to bottom: a supporting plate 19 transparent to X-rays, a fluorescent screen 1, a transparent electrode 2, a photoconductor film 3, an intermediate plate 20 capable of transmitting an electrical potential distribution between its top and bottom faces, and a mosaic of small mirrors 21 arranged upon the bottom face. The intermediate plate 20 is a plate exhibiting transverse electrical conduction and constituted by an assembly of conductor filaments disposed perpendicularly to its faces and embedded in a binder which insulates them from one another. The mirrors 21 are themselves insulated from one another and are each in respective contact with the associated bottom ends of the conductor filaments; the top ends of the conductor filaments are in contact with the photoconductor film 3. The assembly of the intermediate plate 20 and the mosaic of mirrors 21, prevents the read-out light emitted by a light source 22 from driving the photoconductor film 3 conductive; however, this optical insulation in no way impedes transmission of the local electrical potentials between the photoconductive film 3 and the liquid crystal film 7.

The display system of FIG. 5 can be associated with a camera 23 which picks up the light from the source 22, after it has been scattered by the liquid crystal film 7. Those regions of the film 7 which have remained in the non-scattering state, reflect the light at the mirrors 21; since this reflected light falls outside the camera lens the transparent areas appear dark upon the screen of the television monitor 24. The voltage supplied by the bias source 18 is split in a variable ratio across each elementary couple constituted by the series disposition of a photoconductor zone and a liquid crystal zone, so that on the bottom face of the system a scatter image is seen which is the faithful replica of the X-ray pattern being projected at the same instant.

It goes without saying that the invention is in no way limited to the display of patterns projected by X-rays; it is equally applicable to images projected by γ-rays or by particle beams, provided that the fluorescent screen is chosen in accordance with the nature of the ionizing radiation in question. The invention is applicable, of course, to medical radiography and radioscopy, but has other industrial applications, in particular in non-destructive testing of materials.

What we claim is:

1. Liquid crystal image converter system for displaying a visible image in response to an image bearing beam of ionizing radiation, said system comprising: a screen of fluorescent material for collecting said beam, a photoconductor film having one face optically coupled with said screen, a liquid crystal film electrically coupled to the face of said photoconductor film opposite said one face, and electrical biasing means for applying a voltage across said films; the electrical coupling of said films allowing the transmission of a non-uniform potential distribution; said photoconductor film being photo-induced by said radiation through the medium of said screen; the voltage drop across said liquid crystal film rising above the dynamic scattering threshold of said liquid crystal within each photo-induced area of said photoconductor film.

2. Image converter system as claimed in claim 1, wherein said liquid crystal film is a nematic phase liquid crystal material.

3. Image converter system as claimed in claim 1, wherein said liquid crystal film is made of a mixture of nematic and cholesteric liquid crystal materials exhibiting a persistence of the scattering state developed.

4. Image converter as claimed in claim 1, wherein said electrical biasing means comprise a pair of transparent electrodes arranged opposite one another and means for applying a voltage between said electrodes, said films being located between said electrodes.

5. Image converter system as claimed in claim 4, wherein one of said electrodes is in contact with said photoconductor film and with said screen; the other electrode being deposited upon a transparent substrate and being in contact with said liquid crystal film; said films being in contact with each other.

6. Image converter system as claimed in claim 4, wherein one of said electrodes is deposited upon a transparent substrate and has a face in contact with said liquid crystal film; the other electrode being in contact with said photoconductor film and being separated from said screen by an optical fibre plate; the fibres of said optical fibre plate being disposed perpendicularly to its faces; said films being in contact with each other.

7. Image converter system as claimed in claim 5, further comprising: a window of a material permeable to said ionizing radiation; said screen being located between said window and the electrode in contact with the photoconductor film.

8. Image converter system as claimed in claim 7, wherein said permeable material is beryllium.

9. Image converter system as claimed in claim 4, wherein said films are separated by a plate exhibiting transverse conduction and acting as an opaque screen; said transverse conduction plate being capable of transmitting from one to the other of its faces, the local values of the electrical potential.

10. Image converter system as claimed in claim 9, wherein the face of said transverse conduction plate, which is disposed towards said liquid crystal film, is coated with a mosaic of small mirrors insulated from one another.

11. Image converter system as claimed in claim 1, wherein said fluorescent screen is made of a material sensitive to X-rays.

* * * * *